United States Patent [19]

Fisher et al.

[11] 4,163,400
[45] Aug. 7, 1979

[54] THRUST WASHER CONSTRUCTION FOR DIFFERENTIAL

[75] Inventors: William F. Fisher; Paul C. Rosenberger, both of Decatur, Ill.

[73] Assignee: Caterpillar Tractor Co., Peoria, Ill.

[21] Appl. No.: 806,046

[22] Filed: Jun. 13, 1977

[51] Int. Cl.² ............................................. F16H 1/38
[52] U.S. Cl. .................................... 74/710; 74/710.5; 74/713
[58] Field of Search ........................ 74/710, 713, 711; 308/163

[56] References Cited

U.S. PATENT DOCUMENTS

| | | | |
|---|---|---|---|
| 3,549,218 | 12/1970 | Cagnon et al. | 308/163 |
| 3,653,280 | 4/1972 | Koskela | 74/713 |
| 3,724,289 | 4/1973 | Kennicutt | 74/711 |

Primary Examiner—Benjamin W. Wyche
Assistant Examiner—James Yates
Attorney, Agent, or Firm—Wegner, Stellman, McCord, Wiles & Wood

[57] ABSTRACT

A differential including a housing having an internal surface defining a chamber, a drive gear secured to the housing externally thereof, a pair of side gears within the housing, a spider within the housing and between the side gears and extending into the housing at spaced locations on the internal surface, pinions journalled on and carried by the spider within the housing and engaged with the side gears, elongated recesses in the internal surface at the spaced locations, and noncircular thrust washers interposed between the internal surface and the corresponding one of the pinions, the washers being a size and shape to be tightly received within the recesses and about the sides thereof for a substantial distance to fix the washer against rotation relative to the housing.

2 Claims, 3 Drawing Figures

THRUST WASHER CONSTRUCTION FOR DIFFERENTIAL

BACKGROUND OF THE INVENTION

This invention relates to differential constructions and, more specifically, to thrust washer constructions in differentials.

Thrust washers are commonly interposed between the housing or casing of a differential and the side gears and/or pinions contained therein. The typical thrust washer utilized in prior art constructions has a generally circular exterior shape provided with one or more notches or holes in the periphery thereof for receiving pins which extend through bores in the housing to an exact distance slightly less than the washer thickness and which restrain the washer against rotation relative to the housing.

This approach, while providing a differential which is satisfactory in use, poses a number of difficulties from the manufacturing standpoint. Firstly, where a manufacturer is providing differentials of different sizes, it is necessary to provide tooling and thrust washers of different sizes, one for each size of differential. Secondly, the drilling of the bores for receiving the restraining pins in the housing is time-consuming and expensive.

SUMMARY OF THE INVENTION

The present invention is directed to overcoming one or more of the above problems.

According to the present invention, there is provided a differential having an internal surface defining a chamber. A drive gear secured to the housing externally thereof and a pair of side gears are disposed within the housing. A spider is also disposed within the housing between the side gears and extends into the housing in spaced locations on the internal surface. Pinions are journalled on and carried by the spider within the housing and are engaged with the side gears. A noncircular recess is located on the internal surface adjacent at least one of the side gears or the pinions and a noncircular thrust washer is interposed between the internal surface and one of the side gears and the pinions. The washer is sized and shaped to be snugly received within the recess and abuts the sides thereof over a substantial distance to fix the washer against rotation.

Other objects and advantages will become apparent from the following specification taken in connection with the accompanying drawings.

DESCRIPTION OF THE PREFERRED EMBODIMENT

Figure 1:
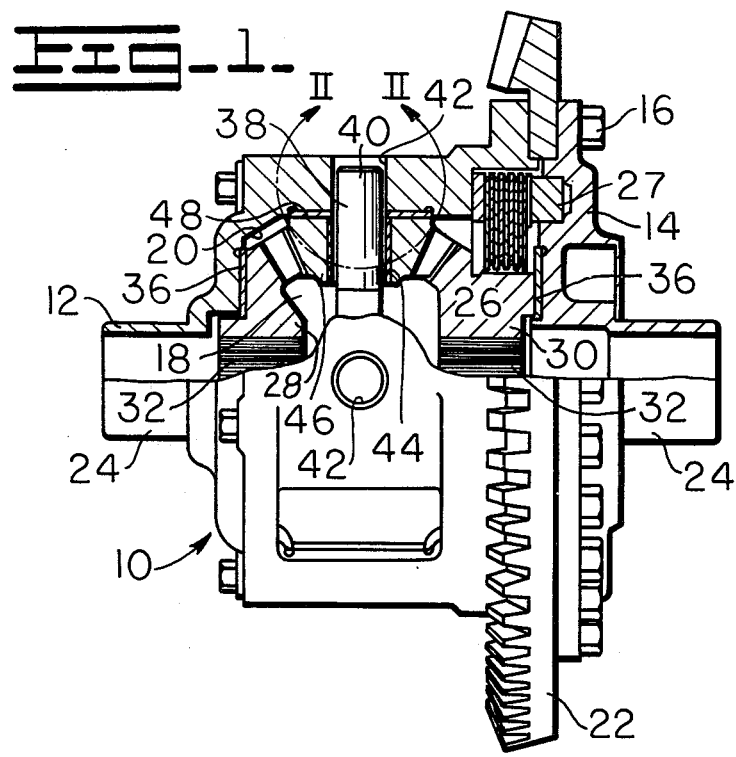
FIG. 1 is an elevational view of a differential made according to the invention with parts shown in section for clarity.

An exemplary embodiment of a differential construction made according to the invention is illustrated in FIG. 1 and is seen to include a housing, generally designated 10. The housing is formed of a first, conventional, two-part, cup-shaped casting 12 and a second, closure-like casting 14. Bolts 16 secure the two together to define an internal chamber 18 having an interior surface 20.

A gear 22 is interposed between the housing components 12 and 14 with its teeth located on the exterior thereof in generally conventional fashion.

Each of the housing components 12 and 14 has a sleeve 24 for receipt of an axle or the like, the two sleeves 24 being oppositely directed.

In the embodiment illustrated, provision may be made for limited slip means in the form of interleaved discs 26 and an actuating piston 27, the details of which form no part of the present invention.

Side gears 28 and 30 are disposed within the chamber 18 and have splined bores 32 aligned with corresponding ones of the sleeves 24 for receipt of the splined end of an axle in a conventional fashion. The side gears 28 and 30 are backed against the interior surface 20 of the housing 10 and interposed therebetween are thrust washers 36.

A four-stub shafted spider 38 is interposed between the chamber 18 and the ends 40 of each of the four stub shafts forming the spider 38 and extend into the housing component 12 via bores 42 therein. Each of the stub shafts forming the spider 38 journals, by means of a sleeve bearing 44, a pinion 46 which is meshed with both side gears 28 and 30. Thrust washers 48 are interposed between the pinions 46 and the internal surface 20 of the housing 10.

Figure 2:
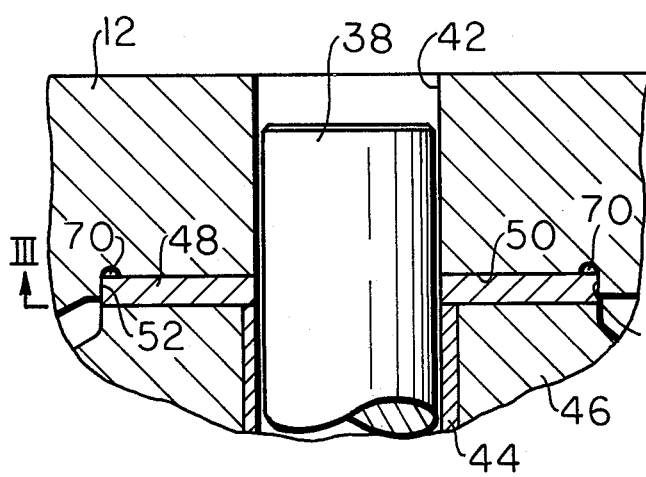
FIG. 2 is an enlarged, fragmentary sectional view of the area approximately delimited by the line 2—2 in FIG. 1.
Figure 3:
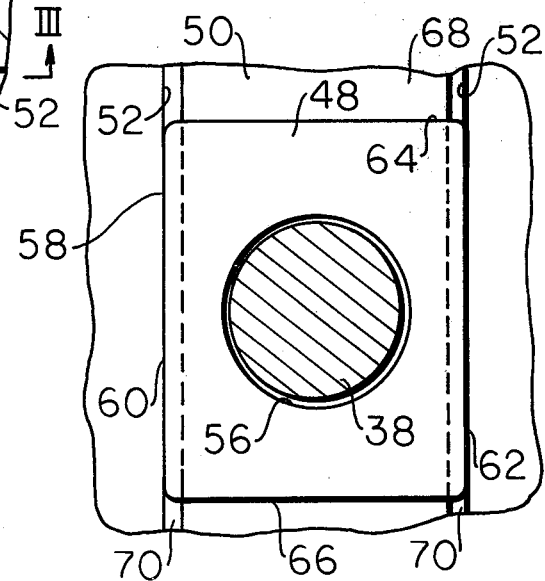
FIG. 3 is a sectional view taken approximately along the line 3—3 of FIG. 2.

Turning now to FIGS. 2 and 3, at each of the locations whereat a stub shaft of the spider 38 extends into a bore 42, a recess 50 is formed on the interior surface 20 of the housing 10. The recess 50 is noncircular in shape and preferably is formed by broaching. When so formed, it will have parallel sides 52 and will be elongated, as best seen in FIG. 3.

Each of the thrust washers 48 has a center bore 56 receiving the corresponding stub shaft of the spider 38 and a noncircular exterior peripheral surface 58. The peripheral surface 58 is shaped and sized so as to be received within the corresponding recess 50 and abut the sides thereof over a substantial distance, as seen in FIG. 3, to affix the washer against rotation. When the sides 52 of the groove 50 are parallel, the washer 48 will have parallel sides 60 and 62 spaced a distance corresponding to the spacing between the sides 52 of the recess.

In a preferred embodiment, the remaining sides 64 and 66 are also parallel and are at right angles to the sides 60 and 62 so that the exterior configuration of the thrust washer 48 is that of a nonsquare rectangle. Consequently, for relatively small differentials, the sides 60 and 62 may abut the sides 52 of the recess 50 whereas, for larger differentials wherein the spacing between the sides 52 are greater than that shown in FIG. 3, the washer 48 may be rotated 90° and the sides 64 and 66 abutted against the sides 52 of the recess 50 in the larger differential. As a consequence, one washer may be utilized in two sizes of differentials, thereby reducing tooling costs in forming the washers as well as reducing inventories in that only one type of washer need be maintained and supplied for replacement purposes for two different differential constructions.

Preferably, each recess 50 will have a flat bottom 68 so as to firmly support the side of the washer 48 remote from the pinion 46.

Because, according to the preferred embodiment, the recesses 50 are broached in the housing 10 and broaches tend to wear rapidly if the corners are not chamfered or rounded, and it is undesirable to chamfer the edges of the washer 48 because of the expense of so doing, grooves 70 are located in the bottom 68 of the recess 50 and immediately adjacent sides 52. The grooves 70 eliminate any need for chamfering the corners of the washers 48 and at the same time allow the use of chamfered corners on the broach forming the recesses 50 to enhance the life thereof and reduce the loads on the edges of the washers 48.

While the invention has been described in connection with thrust washers 48 used with the pinions 46, those skilled in the art will recognize that the thrust washers 36 used in connection with the side gears 28 and 30 could be similarly formed with similar broached recesses formed about the inner openings of the sleeves in the housing components 12 and 14.

From the foregoing, it will be appreciated that a differential made according to the invention can be economically manufactured in that one size of the thrust washer can serve in two different sizes of differentials to reduce manufacturing cost of the washers and inventory control costs. It will also be recognized that considerable expense is saved in a differential made according to the invention in that there is no need to form additional bores in the housing 10 for receipt of pins or dowels which extend into recesses or slots in the washers to pin the washers against rotation. Moreover, the time-consuming job of installing retaining pins to a controlled degree of extension is eliminated. As a consequence, manufacturing costs are substantially reduced.

The embodiments of the invention in which an exclusive property or privilege is claimed are defined as follows:

1. A differential comprising:
   a housing having an internal surface defining a chamber;
   a drive gear secured to said housing externally thereof;
   a pair of side gears within said housing;
   a spider within said housing and between said side gears and extending into said housing at spaced locations on said internal surface;
   pinions journalled on and carried by said spider within said housing and engaged with said side gears;
   a noncircular recess in said internal surface adjacent at least one of said side gears and said pinions; and
   a noncircular thrust washer interposed between said internal surface and the one of said side gears and said pinions, said washer being sized and shaped to be snugly received within said recess and abut the sides thereof over a substantial distance to fix the washer against rotation;
   said recess having parallel sides and a flat bottom, said bottom being grooved immediately adjacent said sides, said washer having two parallel sides abutting said recess sides and overlying the adjacent groove, whereby said grooves permit said recess to be formed by broaching and thus eliminate the need for chamfering said washer.

2. The differential of claim 1 wherein said washer has a nonsquare rectangular shape.

* * * * *